United States Patent

Maker

Patent Number: 5,087,405
Date of Patent: Feb. 11, 1992

[54] IN MOLD OVERLAY PROCESS FOR GEL COATED GLASS FIBER REINFORCED LAMINATES

[75] Inventor: Walter J. Maker, Eustis, Fla.

[73] Assignee: Coplas, Inc., Fort Smith, Ark.

[21] Appl. No.: 268,425

[22] Filed: Nov. 8, 1988

[51] Int. Cl.$^5$ .................. B29C 39/10; B29C 39/12
[52] U.S. Cl. ................. 264/255; 264/257; 264/245
[58] Field of Search ............. 264/250, 255, 257, 258, 264/129, 130, 131, 132, 134, 135, 136, 137, 245

[56] References Cited

U.S. PATENT DOCUMENTS

| | | | |
|---|---|---|---|
| 4,123,582 | 10/1978 | Musyt | 264/255 |
| 4,283,462 | 8/1981 | Meyer | 264/255 |
| 4,316,869 | 2/1982 | Van Gasse | 264/255 |
| 4,350,739 | 9/1982 | Muhivddin | 264/255 |
| 4,356,230 | 10/1982 | Emanuel | 264/250 |
| 4,499,235 | 2/1985 | Verwer | 264/255 |
| 4,599,212 | 7/1986 | Meyer | 264/255 |
| 4,610,835 | 9/1986 | Gharamikia | 264/255 |
| 4,615,057 | 10/1986 | Favreav | 264/255 |
| 4,830,803 | 5/1989 | Matsumaru | 264/255 |

*Primary Examiner*—Jay H. Woo
*Assistant Examiner*—Jeremiah F. Durkin, II
*Attorney, Agent, or Firm*—Ronald E. Smith; Joseph C. Mason

[57] ABSTRACT

A method of protecting glass fiber reinforced products from the effects of weathering by applying a polymeric resin overlay to the product in mold. Conventional waxing of molds is eliminated. The mold is prepared by applying a layer of a lecithin solution, and the overlay is applied thereafter. A layer of gel coat is then applied to the overlay, the gel coat is reinforced and the overlay-protected product is demolded. The invention also includes a method for making an overlay-protected synthetic marble product.

15 Claims, 1 Drawing Sheet

IN MOLD OVERLAY PROCESS FOR GEL COATED GLASS FIBER REINFORCED LAMINATES

TECHNICAL FIELD

This invention relates, generally, to methods for protecting gel coated products from the effects of ultraviolet radiation, and more particularly relates to an in mold overlay process that includes the use of polymeric resins to protect the gel coat.

BACKGROUND ART

Glass fiber reinforced products (FRP) include glass fiber marine craft, showers and bathtubs, building and automotive panels, swimming pools, satellite dishes, and the like.

Conventional FRP construction methods include the construction of a mold, the application of a releasing agent such as a wax to the mold, the application of a gel coat to the waxed mold, and the application of a glass fiber reinforced laminate to the gel coat. The unsaturated polyester resin contained in the gel coat and the ensuing laminating resin which binds the glass fiber reinforcement is a styrene or styrene/methyl methacrylate, free radical initiated, liquid thermosetting resin which upon catalysis with an organic peroxide such as methyl ethyl ketone peroxide, gels and cures to a solid thermosetting state.

Accordingly, when the FRP is removed from the mold, the glass fiber reinforced laminate is covered by the decorative layer of gel coat.

The a gel coat may be pigmented or unpigmented, but most FRP laminates have a pigmented gel coat for esthetic purposes.

Unfortunately, prolonged exposure to ultraviolet radiation affects the gel coat in several detrimental ways. For example, a gel coat exposed to sunlight and other elements will lose its gloss in a relatively short period of time. This loss of gloss is known in the FRP industry as chalking.

Moreover, white and off-white gel coats turn yellow upon exposure to weathering; pastel colors darken or fade.

Medium colored gel coats (blacks, dark blues, greens, reds, etc.) also fade or darken upon exposure.

Gel coat requires an organic peroxide as a catalyst for gel and cure; its cure is dependent upon catalyst concentration, ambient temperature and humidity. Thus, chemical reaction sensitivity is another undesirable effect of weathering on gel coat.

The known shortcomings of gel coat have spurred inventors to find ways to protect it from the elements. One popular protection technique is to make the FRP in the conventional manner and to apply a protective coating over the gel coat when the FRP has been removed from the mold (demolded).

That technique is unsatisfactory, however, because the post-applied protective layer separates from the gel coat because a good bond is not achieved.

Specific prior art methods are shown in the following U.S. Pat. Nos.: 4,123,582; 4,209,486; 4,239,808; 4,244,993; 4,248,816; 4,331,735; 4,356,230; 4,367,192; 4,414,173 and 4,528,227.

There is a clear need for an improved process for making FRP laminates; the improved process would result in a protected gel coat, but the prior art contains no teachings or suggestions as to how the art could be advanced.

DISCLOSURE OF INVENTION

The present invention eschews the unsatisfactory techniques of the prior art altogether and pioneers the art of in mold gel coat protection.

A thermosetting or thermoplastic overlay which may be clear or pigmented is brushed or sprayed onto a mold of any type. The FRP is then constructed in the usual fashion, i.e., the gel coat is applied to the overlay, the glass fiber reinforced laminate is applied to the gel coat, and the FRP is demolded.

Numerous suggested overlays are disclosed.

The novel methods do not significantly lengthen the time required to construct the FRP, because the suggested overlays and their equivalents do not require catalysis. Thus, no pot life problems are created nor is there any concern over prolonged curing rates at low temperature and high humidity conditions.

Most importantly, the in mold overlays of this invention are not subject to film surface imperfections such as porosity, resin tearing, pigment separation or pin holing.

It is a broad objective of this invention to disclose a new method for constructing glass fiber reinforced products.

A more specific object of this invention is to disclose means for protecting the gel coat layer of glass fiber reinforced products from the effects of prolonged exposure to UV radiation and weathering in general.

Perhaps the most important object of this invention is to pioneer the art of in mold gel coat protection techniques, thereby opening up an entirely new field of endeavor.

The invention accordingly comprises the features of construction, combination of elements and arrangement of parts that will be exemplified in the method set forth hereinafter and the scope of the invention will be set forth in the claims.

BRIEF DESCRIPTION OF DRAWINGS

For a fuller understanding of the nature and objects of the invention, reference should be made to the following detailed description, taken in connection with the accompanying drawings, in which.

Similar reference numerals refer to similar parts through the several views of the drawings.

BEST MODES FOR CARRYING OUT THE INVENTION

Figure 1:
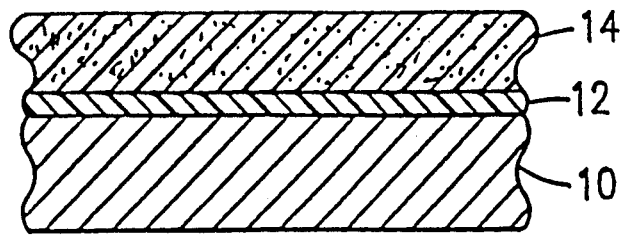
FIG. 1 is a diagrammatic view of an FRP of the prior art.

Referring now to FIG. 1, it will there be seen that prior art methods of constructing FRP laminates include applying a relatively thin layer (10–60 mils) of a catalyzed liquid gel coat 12, by spray or brush, to a properly prepared mold surface 10. After gelation and cure at room temperature, the gel coat is reinforced by glass fiber, in chopped or mat form, with a catalyzed liquid unsaturated polyester-styrene base laminating resin 14. The composite is allowed to cure at room temperature and is demolded to produce the FRP.

As a result of this well-known prior art procedure, the outer surface of the FRP is the unprotected gel coat layer.

Figure 2:
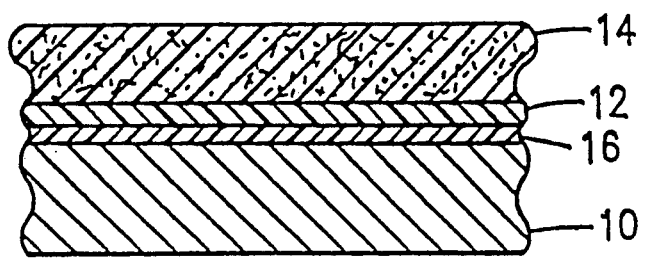
FIG. 2 is a diagrammatic view of an FRP constructed in accordance with the novel methods disclosed herein.

The steps of the inventive procedure may be understood at least in part in connection with FIG. 2.

A clear or pigmented overlay 16 is applied to mold 10, by spray or brush. The overlay, which preferably consists of commercially available organic thermoplastic or thermosetting polymeric resins dissolved in appropriate chemical solvents, is allowed to dry at room temperature to a print-free state.

Thereafter, the method of constructing an FRP is conventional; the overlay and gel coat composite 12 is allowed to cure at room temperature before it is reinforced with glass fiber and laminating resin 14.

The overlay is thus applied in mold.

The large variety of overlays disclosed hereinafter do not require catalysis. Thus, the overlays have long pot lives and short curing rates, even at low temperature and high humidity conditions, which features are not present in overlays applied to FRP s after demolding (post-applied overlays).

Overlays which have been found suitable include vinyls, cellulosics, acrylics, silicones and combinations thereof.

The novel overlays not only protect the gel coat against the deleterious effects of weathering, including ultraviolet radiation, they also reduce or eliminate the need to prepare the mold by waxing it. The novel overlays, in other words, do not require a releasing agent as they do not bond to unwaxed mold surfaces, i.e., they form their own parting film. This surprising feature of the overlays reduces the time required to construct FRP's.

Moreover, instead of a time-consuming application of wax to the mold surface, followed by another time-consuming buffing of the wax to a high gloss, it has been discovered that a lecithin solution may be wiped onto an otherwise unprepared mold surface to prepare it to receive the overlay. It has been found that application of the overlays disclosed more specifically hereinafter to waxed mold surfaces results in unsatisfactory wet film conditions such as cratering, crawling or fish eyes. The application of a lecithin solution eliminates these wet film problems and produces a uniform and continuous film.

The use of lecithin has the additional advantage of eliminating wax buildup and the time-consuming problems of wax stripping associated therewith. The lecithin solution is self-cleaning, results in a glossy FRP, and the mold surface remains clean for extended periods of time.

It has also been discovered that the glass fiber reinforcement and laminating resins of conventional FRP construction may be replaced with different reinforcing materials, such as urethane foam, due to the provision of the novel overlays.

Specific examples of the inventive methods will now be disclosed. Unless otherwise indicated, all parts are by weight.

EXAMPLE NO. 1

A solution of a vinyl copolymer was prepared as follows:

| | |
|---|---|
| 60.0 | parts hydroxyl modified vinyl chloride-vinyl acetate copolymer (such as Bakelite VAGH, manufactured by Union Carbide Corp.) |
| 89.6 | parts methyl isobutyl ketone |
| 89.6 | parts toluol |
| 10.0 | parts cellosolve acetate |
| 40.0 | parts methyl ethyl ketone |
| 289.2 | parts |

The solution at 20.76% VAGH resin solids was applied by a draw-down applicator, over a mica mold surface, one-half of which was waxed with Mirror Glaze Mold Wax and the other half treated with a 20% solution of lecithin in toluol. Both treated mica mold surfaces were buffed to a high gloss before the draw-down.

The VAGH solution cratered and crawled excessively over the waxed mica mold surface; the VAGH solution flowed uniformly over the lecithin treated mica mold surface without any separation, pin-holing, cratering or crawling.

Similar draw-downs were accomplished with acrylic and cellulosic and silicone thermoplastic resin solutions with identical results. It was also observed that a 2% solution of lecithin wipe-on was just as effective as the 20% lecithin solution with the advantage that the 2% lecithin solution wipe-on did not require any buffing as was required for the 20% lecithin solution.

Identical results were obtained when the lecithin wipe-on solution was employed over tooling gel-coated mold surfaces as currently used in the FRP industry.

The remaining examples include the use of a 2% lecithin solution in toluol wipe-on without any buffing.

EXAMPLE NO. 2

A white pigmented vinyl overlay coating was prepared as follows:

| | |
|---|---|
| 20 | parts hydroxyl modified vinyl chloride-vinyl acetate copolymer |
| 40 | parts toluol |
| 40 | parts methyl ethyl ketone |
| 0.4 | parts U.V. absorber and light stabilizers |
| 25.0 | parts titanium dioxide pigment |

The white pigment was dispersed in the solution until a Nord grind rating of 7 was attained.

| Preparation of the in-mold overlay Gel Coat Glass Fiber Reinforced Laminate | |
|---|---|
| Step No. 1 | Apply by wipe-on a 2% lecithin solution in toluol on a mica mold surface; allow to dry |
| Step No. 2 | Apply by a draw-down applicator a 10 mil deposition of the VAGH vinyl white overlay coating over the lecithin-treated mica mold surface; allow to dry to print-free status |
| Step No. 3 | Apply by draw-down applicator a 30 mil deposition of CoPlas CG-A510 Neutral Gel Coat catalyzed with 1¼% methyl ethyl ketone peroxide over the VAGH white overlay; allow to cure at room temperature |
| Step No. 4 | Reinforce the VAGH overlay-neutral gel coat composite with 2 plies of 1½ ounce glass fiber mat with CoPlas CX-1985 polyester |

| Preparation of the in-mold overlay Gel Coat Glass Fiber Reinforced Laminate | |
| --- | --- |
| | laminating resin catalyzed with 1% methyl ethyl ketone peroxide; allow to cure overnight |
| Step No. 5 | After overnight curing, demold the white overlay-gel coat glass fiber reinforced composite laminate |

The white VAGH vinyl overlay coating helped to release the composite laminate from the mold surface and formed an integral part of the neutral gel coat; it possessed excellent adhesion to the neutral gel coat barrier coat and provided a decorative surface which exhibited improvements over a commercially available white gel coat when exposed to U.V. radiation in a QUV chamber for 100, 200, and 300 hours.

The delta E ($\Delta E$) ratings represent the degree of yellowing or darkening of the gel coat overlay; the lower the rating, the lower the color change.

| PRODUCT | QUV $\Delta$ E RATINGS Hours | | | % GLOSS RETENTION Hours | | |
| --- | --- | --- | --- | --- | --- | --- |
| | 100 | 200 | 300 | 100 | 200 | 300 |
| Commercially available white gel coat | 11.39 | 15.88 | 15.5 | 66.9 | 8.5 | 3.9 |
| CP-91487A white pigmented VAGH overlay | 12.65 | 9.49 | 8.88 | 107.4 | 40.9 | 30.7 |

The VAGH in-mold overlay exhibited less yellowing ($\Delta E$) and a much improved gloss retention upon exposure to ultraviolet radiation when compared to the commercially available white gel coat.

EXAMPLE NO. 3

A white pigmented cellulose acetate butyrate overlay coating was prepared as follows:

| 15 | parts cellulose acetate butyrate (such as the CAB 381 series manufactured by Eastman Chemical Products) |
| --- | --- |
| 60 | parts toluol |
| 25 | parts methyl ethyl ketone |
| 0.3 | parts U.V. absorber and light stabilizer |
| 15 | parts titanium dioxide white pigment |

The white pigment was dispersed in the solution until a Nord grind rating of 7 was attained.

A white pigmented overlay-gel coat glass fiber reinforced laminate was prepared in the same manner as recited in Example No. 2.

The white cellulose acetate butyrate overlay coating helped to release the composite laminate from the mold surface and formed an integral part of the neutral gel coat; the overlay coating possessed excellent adhesion to the neutral gel coat barrier coat. It also possessed improvements over a commercially available white gel coat when exposed to U.V. radiation in a QUV testing chamber for 100 hours as indicated in the following summary:

| PRODUCT | QUV $\Delta$ E RATING 100 Hours | % GLOSS RETENTION 100 Hours |
| --- | --- | --- |
| Commercially available white gel coat | 11.39 | 66.9% |
| CP-52587D White pigmented cellulose acetate butyrate overlay | 0.96 | 101.0% |

The white cellulose acetate butyrate in-mold overlay exhibited approximately a ten-fold improvement in non-yellowing and a 35% improvement in gloss retention.

It was found that a companion cellulosic resin, cellulose acetate propionate, behaved similarly to the butyrate resin when compounded in the identical manner as described in Example No. 3. The noted improvements of the white pigmented cellulose acetate propionate overlay after a 100 hour exposure to U.V. radiation in a QUV testing chamber are disclosed as follows:

| PRODUCT | QUV $\Delta$ E RATING 100 Hours | % GLOSS RETENTION 100 Hours |
| --- | --- | --- |
| CP-91587E White pigmented cellulose acetate propionate overlay | 1.57 | 91.7% |

EXAMPLE NO. 4

A white pigmented acrylic polymer overlay coating was prepared as follows:

| 80 | parts rigid acrylic copolymer solution (such as QR-646 manufactured by Rohm and Haas, Inc.) |
| --- | --- |
| 20 | parts flexible acrylic copolymer solution (such as B-72 manufactured by Rohm and Haas, Inc.) |
| 20 | parts toluol |
| 0.92 | parts U.V. absorber and light stabilizer |
| 36 | parts titanium dioxide white pigment |

The white pigment was dispersed in the solution until a Nord grind rating of 7 was attained.

A white pigmented overlay-gel coat glass fiber reinforced laminate was prepared as recited in Example No. 2.

The white pigmented all acrylic overlay released easily from the mold surface and formed an integral part of the neutral gel coat; the all acrylic in-mold overlay possessed excellent adhesion to the neutral gel coat barrier coat. It also possessed improvements over a commercially available white gel coat when exposed to U.V. radiation in a QUV testing chamber for 100 hours:

| PRODUCT | QUV $\Delta$ E RATING , 100 Hours | % GLOSS RETENTION 100 Hours |
| --- | --- | --- |
| Commercially available white gel coat | 11.39 | 66.9% |
| CP-41687B White pigmented all acrylic | 3.13 | 98.0% |

The white all acrylic in-mold overlay exhibited approximately a four-fold improvement in non-yellowing (ΔE) and virtually no loss of gloss after 100 hours of exposure to U.V. radiation.

The results of experiments as cited in the examples indicate that combinations of compatible vinyls, cellulosics and acrylic polymers would also have identical beneficial improvements over commercially-available gel coats.

EXAMPLE NO. 5

A clear cellulose acetate butyrate (CAB) overlay coating was prepared as follows:

| |
|---|
| 15 parts cellulose acetate butyrate (CAB) |
| 60 parts toluol |
| 25 parts methyl ethyl ketone |
| 0.3 parts U.V. absorber and light stabilizer |

| Preparation of the Clear In-Mold Overlay - Gel Coat Glass Fiber Reinforced Laminate | |
|---|---|
| Step No. 1 | Apply by wipe-on a 2% lecithin solution in toluol on a mica mold surface; allow to dry |
| Step No. 2 | Apply by a draw-down applicator a 10 mil deposition of the clear CAB overlay coating over the mica mold surface; allow the overlay coating to dry to print-free status |
| Step No. 3 | Apply by a draw-down applicator a 30 mil deposition of a commercially available white gel coat catalyzed with 1½% methyl ethyl ketone peroxide over the clear CAB overlay; allow to gel and cure at room temperature |
| Step No. 4 | Reinforce the clear CAB overlay - white gel coat composite with 2 plies of 1½ ounce glass fiber mat with CoPlas CX-1985 polyester laminating resin catalyzed with 1% methyl ethyl ketone peroxide; allow to cure overnight |
| Step No. 5 | After overnight curing, demold the clear CAB - white gel coat glass fiber reinforced laminate |

The clear CAB inmold overlay—gel coat glass fiber reinforced composite demolded easily from the mica mold surface. The clear overlay exhibited excellent adhesion to the white commercially available gel coat, indicating that it formed an integral part of the laminate. The clear CAB overlay—white gel coat composite was exposed to U.V. radiation in a QUV testing chamber for periods of 100, 100, and 300 hours. The results of the U.V. exposure are as follows:

| PRODUCT | QUV ΔE RATINGS Hours | | | % GLOSS RETENTION Hours | | |
|---|---|---|---|---|---|---|
| | 100 | 200 | 300 | 100 | 200 | 300 |
| Commercially available white gel coat without clear overlay | 11.39 | 15.88 | 15.5 | 66.9 | 8.5 | 3.9 |
| CP-8387A-1 with clear CAB overlay | 2.44 | 4.90 | 6.3 | 106.8 | 114.1 | 117.3 |

There was a dramatic (approximately 60%) improvement in non-yellowing (ΔE) of the white gel coat possessing the clear CAB overlay.

Gloss retention ratings were more dramatic in nature with the gloss retention increasing with U.V. exposure. There was no evidence of surface chalking, loss of gloss, or erosion as occurred with the control white gel coat without the clear overlay. It is believed that the increase in gloss retention of the clear CAB overlay is caused by cross-linking of the thermoplastic overlay by U.V. radiation emitted by the QUV testing chamber.

EXAMPLE NO. 6

Figure 3:
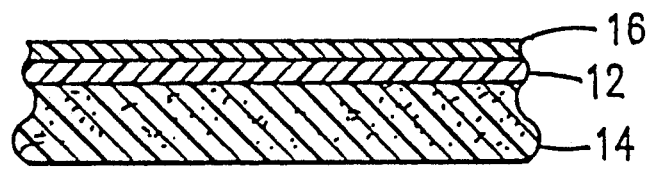
FIG. 3 is a view similar to FIG. 2 but showing a pigmented gel coat.

The clear CAB in-mold overlay concept was further exploited by using it with a medium blue commercially-available gel coat. The overlay—gel coat glass reinforced laminate was prepared in a similar manner to that reported in Example No. 5. The pigmented gel coat is denoted 12 in FIG. 3.

The clear CAB overlay—medium blue gel coat composite demolded easily from the mica mold. The clear overlay exhibited excellent adhesion to the medium blue gel coat, indicating that it formed an integral part of the neutral gel coat. The composite laminate was exposed to U.V. radiation for periods of 100, 200 and 300 hours in a QUV testing chamber. The results of the U.V. exposure are as follows:

| PRODUCT | QUV ΔE RATINGS Hours | | | % GLOSS RETENTION Hours | | |
|---|---|---|---|---|---|---|
| | 100 | 200 | 300 | 100 | 200 | 300 |
| Commercially available medium blue gel coat CP-8387D-1 | 5.48 | 8.52 | 9.69 | 88.7 | 57.6 | 2.4 |
| Commercially available medium blue gel coat with clear CAB "in mold" overlay | 3.89 | 8.03 | 8.88 | 100.8 | 102.1 | 104.0 |

Some improvement was exhibited in the color stability (ΔE) rating and again a dramatic improvement in the gloss retention category was observed.

As reported for the clear CAB overlay—white gel coat composite in Example No. 6, the clear CAB overlay did not exhibit any surface chalking, surface erosion, or loss of gloss with gloss retention increasing with prolonged U.V. exposure.

EXAMPLE NO. 7

Another aspect of this invention which was pursued consisted of comparing the water resistance of the clear in-mold overlay applied over a commercially available gel coat to an identical clear overlay post-applied over a commercially available gel coat.

A clear cellulose acetate butyrate (CAB) overlay coating was prepared as follows:

| |
|---|
| 30 parts cellulose acetate butyrate |
| 60 parts toluol |
| 60 parts methyl ethyl ketone |
| 0.6 parts U.V. absorbers and light stabilizers |

The above CAB clear coating was employed as an in-mold overlay over a commercially available white gel coat (CP-41687C) as described in Example No. 5 and as a post applied (out of mold) coating over a commercially available white gel coat (CP-31987B).

The commercially available white gel coat was sanded before applying the clear CAB coating. The clear CAB in-mold overlay—white gel coat composite as well as the clear CAB coating post-applied over the identical commercially-available white gel coat composite was subjected to 100 hours of U.V. radiation in a QUV chamber and to a water immersion for 24 hours. The results of the QUV exposure and the water immersion test are as follows:

| PRODUCT | QUV - 100 Hours % GLOSS RETENTION | 24 Hrs. Water Immersion at 150° F. |
|---|---|---|
| CP-41687C Commercially available white gel coat with clear CAB "in mold" overlay. | 100.0% | No blistering; excellent adhesion to white gel coat |
| CP-31987B Commercially available white gel coat with clear CAB coating post-applied | 98.0% | 100% concentrated blistering; complete loss of adhesion |

The results indicate that the CAB in-mold overlay possesses much superior water resistance than its counterpart CAB clear coating which was post-applied over a sanded white gel coat surface.

EXAMPLE NO. 8

An identical evaluation as reported in Example No. 7 was employed with a black pigmented CAB coating used as an in-mold overlay and as a post-applied coating over a commercially available black gel coat. The results of a 100-hour exposure to U.V. radiation in a QUV chamber and a 24-hour water immersion at 150° F is reported as follows:

| PRODUCT | QUV - 100 Hours % GLOSS RETENTION | 24 Hrs. Water Immersion at 150° F. |
|---|---|---|
| CP-52387B Black pigmented CAB "in mold" overlay over neutral colored gel coat. | 101.5% | No blistering; excellent adhesion to black gel coat |
| CP-52387 Black pigmented CAB coating post-applied over a sanded gel coat surface. | 94.8% | 100% concentrated pin-point blistering; complete loss of adhesion |

EXAMPLE NO. 9

To evaluate further the novel concept of using clear or pigmented thermoplastic in-mold overlays over gel coats, experiments were performed wherein an alkyd resin containing unsaturated ethylenic groups was added to the overlay to promote interfacial cross-linking or tie in between the in-mold overlay with the subsequent styrene diluted free radical initiated, liquid thermosetting unsaturated polyester resin gel coat.

A white pigmented cellulose acetate butyrate (CAB) overlay coating was prepared as follows:

| |
|---|
| 15 parts cellulose acetate butyrate |
| 60 parts toluol |
| 25 parts methyl ethyl ketone |
| 1.5 parts unsaturated polyester resin (100% resin solids; the concentration of the unsaturated polyester solid resin in the overlay coating formulation being 10% based on total resin solids.) |
| 15 parts titanium dioxide white pigment |
| 0.33 parts U.V. absorber and light stabilizer |

To facilitate blending, the cross-linking unsaturated polyester is dissolved in reactive monomeric solvents such as styrene or methyl methacrylate.

The results achieved with this composition are discussed in connection with the next example.

EXAMPLE NO. 10

A pigmented white CAB overlay similar to the white overlay disclosed in Example No. 9, but with the cross-linking unsaturated polyester resin increased to 20% (based on total resin solids), was prepared.

The white pigment in Examples No. 9 and 10 was dispersed in a solution until a Nord grind rating of 7 was attained.

White pigmented overlay—gel coat glass fiber reinforced laminates were prepared in the same manner as recited in Example No. 2.

Both white overlay—gel coat laminate composites demolded easily from the mica mold. The white overlays exhibited excellent adhesion to the neutral gel coat barrier coat. Both overlays also possessed improvements over a commercially available white gel coat after exposure to U.V. radiation in a QUV testing chamber for 100 hours as indicated:

| PRODUCT | QUV Δ E RATING 100 Hours | % GLOSS RETENTION 100 Hours |
|---|---|---|
| Commercially available white gel coat | 11.39 | 66.9% |
| CP-52587A-1 white pigmented cellulose acetate butyrate overlay containing 10% cross-linking unsaturated polyester resin | 0.96 | 96.8 |
| CP-52587B-1 white pigmented cellulose acetate butyrate overlay containing 20% cross-linking unsaturated polyester resin | 1.06 | 100.0% |

In both instances the white CAB in-mold overlays exhibited remarkable improvement in non-yellowing characteristics and in gloss retention when compared to the commercially available white gel coat.

EXAMPLE NO. 11

All cited examples of in-mold overlays require either:
1. A neutral barrier gel coat for pigmented overlays, or
2. A pigmented barrier gel coat for clear overlays.

The neutral or pigmented barrier gel coats may be eliminated in the manufacture of synthetic marble with a mixture of unsaturated polyester resin and marble dust (calcium carbonate). Example No. 11 describes the composite of the synthetic marble composite.

A clear cellulose acetate butyrate (CAB) overlay coating was prepared as follows:

|   |
|---|
| 30 parts cellulose acetate butyrate |
| 60 parts toluol |
| 30 parts methyl ethyl ketone |

| | Preparation of a Clear In-Mold Overlay for Synthetic Marble |
|---|---|
| Step No. 1 | Apply by wipe-on a 2% lecithin solution in toluol on a mica mold surface; allow to dry |
| Step No. 2 | Apply by a draw-down applicator a 20 mil deposition of the above clear CAB overlay coating over the mica mold surface; allow to dry to a print-free status |
| Step No. 3 | In a confined area pour the following catalyzed marble dust mixture over the clear CAB overlay: |
| | 30 parts accelerated unsaturated polyester resin dissolved in styrene |
| | 65 parts marble dust |
| | 5 parts titanium dioxide white pigment |
| | 0.3 parts methyl ethyl ketone peroxide catalyst |
| Step No. 4 | After overnight curing, demold the synthetic marble composite |

Figure 4:
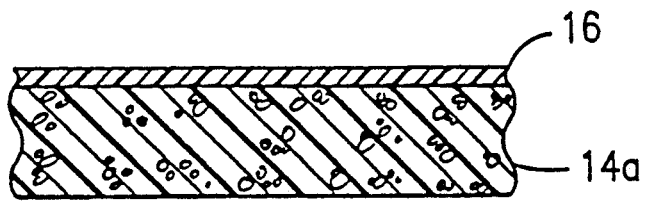
FIG. 4 is a diagrammatic view of an FRP product having a clear overlay disposed in protecting relation to a polyester marble dust mixture.

The clear CAB in-mold overlay-polyester marble dust composite, shown in FIG. 4, demolded easily from the mica mold surface. The clear overlay exhibited excellent adhesion to the polyester-marble dust coating, indicating that it formed an integral part of the overall composite.

The results of these examples prove conclusively that this invention is a pioneering invention and that the claims which follow are to be interpreted broadly, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described what is claimed is:

1. A method of protecting gel coat layer of a glass fiber reinforced product against the effects of weathering, comprising the steps of:
    dissolving a preselected polymeric resin in a solvent to form an overlay material;
    applying the overlay material to a mold surface;
    applying a gel coat layer to the overlay material;
    applying a glass fiber and resin layer to the gel coat layer to reinforce it; and
    demolding the glass fiber reinforced product.

2. The method of claim 1, further comprising the step of selecting a thermoplastic polymeric resin that is a hydroxyl modified vinyl chloride-vinyl acetate copolymer as the preselected resin and dissolving it in a solvent.

3. The method of claim 1, further comprising the step of selecting cellulose acetate butyrate as the preselected resin and dissolving it in a solvent.

4. The method of claim 1, further comprising the step of selecting cellulose acetate propionate as the preselected resin and dissolving it in a solvent.

5. The method of claim 1, further comprising the step of selecting an acrylic copolymer as the preselected resin and dissolving it in a solvent.

6. The method of claim 1, further comprising the step of selecting a silicone as the preselected resin and dissolving it in a solvent.

7. The method of claim 1, further comprising the step of selecting a resin that is selected from the group consisting of a vinyl copolymer, cellulose acetate butyrate, cellulose acetate propionate, silicone or acrylic copolymer and dissolving it in a solvent.

8. The method of claim 1, further comprising the step of applying a lecithin solution to the mold surface prior to applying said overlay material thereto.

9. The method of claim 8, further comprising the step of applying a 2% by weight lecithin solution to the mold surface prior to applying said overlay material thereto.

10. The method of claim 9, further comprising the step of preparing said lecithin solution by dissolving lecithin in toluol.

11. The method of claim 1, further comprising the step of allowing said overlay material to dry to a print free state prior to applying said layer of gel coat thereto.

12. The method of claim 1, further comprising the step of allowing said gel coat layer to gel and cure at room temperature prior to applying said glass fiber and resin layer thereto.

13. The method of claim 1, further comprising the step of adding an ultraviolet radiation absorbing means to said overlay material.

14. The method of claim 13, further comprising the step of adding a light stabilizer means to said overlay material.

15. The method of claim 1, further comprising the step of adding an alkyd resin with unsaturated ethylenic groups to said overlay material to promote interfacial cross-linking and to insure chemical bonding with the gel coat layer.

* * * * *